United States Patent
Grögl et al.

(10) Patent No.: US 7,297,873 B2
(45) Date of Patent: Nov. 20, 2007

(54) ELECTRICAL CABLE

(75) Inventors: Ferdinand Grögl, Nürnberg (DE);
Thomas Mann, Weissenobe (DE)

(73) Assignee: Nexans (FR)

( * ) Notice: Subject to any disclaimer, the term of this patent is extended or adjusted under 35 U.S.C. 154(b) by 0 days.

(21) Appl. No.: 11/288,039

(22) Filed: Nov. 28, 2005

(65) Prior Publication Data
US 2006/0137897 A1     Jun. 29, 2006

(30) Foreign Application Priority Data
Nov. 29, 2004   (EP)   ................... 04292812

(51) Int. Cl.
*H01B 3/44*   (2006.01)
(52) U.S. Cl. ............... 174/121 A; 174/113 R
(58) Field of Classification Search ............ 174/113 R, 174/121 A
See application file for complete search history.

(56) References Cited

U.S. PATENT DOCUMENTS

| | | | |
|---|---|---|---|
| 2,446,292 A * | 8/1948 | Priestley et al. | 174/121 AR |
| 3,425,865 A * | 2/1969 | Shelton, Jr. | 428/384 |
| 3,576,940 A * | 5/1971 | Stone et al. | 174/113 R |
| 4,045,611 A * | 8/1977 | Torgerson | 174/121 SR |
| 4,791,966 A * | 12/1988 | Eilentropp | 138/154 |
| 5,298,284 A * | 3/1994 | Buckwald et al. | 427/203 |
| 5,393,929 A * | 2/1995 | Yagihashi | 174/36 |
| 6,173,100 B1 | 1/2001 | Newton et al. | 385/102 |
| 2003/0118295 A1* | 6/2003 | Lail et al. | 385/101 |
| 2003/0141097 A1* | 7/2003 | Belli et al. | 174/110 R |

FOREIGN PATENT DOCUMENTS

| | | |
|---|---|---|
| DE | 3120325 | 12/1982 |
| DE | 4335147 | 4/1995 |
| EP | 0540815 | 5/1993 |

OTHER PUBLICATIONS

European Search Report—Jun. 28, 2005.

* cited by examiner

*Primary Examiner*—Chau N. Nguyen
(74) *Attorney, Agent, or Firm*—Sofer & Haroun, LLP

(57) ABSTRACT

The invention specifies an electrical cable with at least two electrical conductor cores (1), which are stranded together, and each of which consists of an electrical conductor (3) enclosed in insulation (2), and with a sheath (5) of insulating material that encloses the conductor cores (1). To protect the cable, which in itself is fully functional, from red-hot particles, the sheath (5), which has a wall thickness of at least 0.5 mm, is covered with a barrier in the form of a flameproof strip (6), which is wound in at least one course with overlapping edges. The strip (6) is covered with a layer (7) of a material that swells when exposed to moisture and that is surrounded by an outer sheath (8) of insulating material.

10 Claims, 1 Drawing Sheet

ELECTRICAL CABLE

RELATED APPLICATION

This application is related to and claims the benefit of priority from European Patent Application No. 04 292 812.7, filed on Nov. 29, 2004, the entirety of which is incorporated herein by reference.

FIELD OF THE INVENTION

The invention concerns an electrical cable with at least two electrical conductor cores, which are stranded together, and each of which consists of an electrical conductor enclosed in insulation, and with a sheath of insulating material that encloses the conductor cores.

BACKGROUND

A cable of this type is used, for example, to connect nonstationary pieces of equipment with a voltage or signal source. The cable's conductor cores, which consist of a conductor surrounded by insulation, are thus power conductors and/or communication or signal conductors. Examples of nonstationary pieces of equipment are cranes, machine tools, and especially robots. A cable of this type must be capable of withstanding mechanical loads and have flexural strength that remains constant for an extended period of time. It should also remain flexible in a wide temperature range of, for example, −40° C. to +80° C.

In the previously known cable described in the above-cited document DE 201 09 974 U1, plastic filler elements are arranged in the stranding gaps of the conductor cores. They are stranded together with the conductor cores to form a unit that is surrounded by a sheath of insulating material. The stranding together of the conductor cores is intended to reduce the effect of external magnetic fields and to increase electromagnetic compatibility, radiation resistance, and noise immunity. The cited document provides no information about the structure of the sheath. The same is true with respect to its behavior at high temperatures and in contact with hot, especially red-hot, particles.

OBJECTS AND SUMMARY

The objective of the invention is to design the cable described above in such a way that its function is preserved without limitation even if it is struck by red-hot particles.

In accordance with the invention, this objective is achieved
- by covering the sheath, which has a wall thickness of at least 0.5 mm, with a barrier in the form of a flameproof strip, which is wound in at least one course with overlapping edges, in order to protect the cable, which in itself is fully functional, from red-hot particles, and
- by covering the strip with a layer of a material that swells when exposed to moisture and that is surrounded by an outer sheath of insulating material.

The strip made of flameproof material surrounds the core of the cable, which consists of the conductor cores and sheath. The core of the cable is fully functional in itself by virtue of the sheath, which has a minimum wall thickness of 0.5 mm. The strip of flameproof material provides a barrier to red-hot particles, such as drops of welding material, which effectively protects the core of the cable from red-hot particles that have been able to penetrate the outer sheath of the cable. Although moisture is able to penetrate the holes produced in the outer sheath by the red-hot particles, it is blocked by the layer of material which covers the strip of flameproof material and swells when exposed to moisture. Therefore, the moisture is unable to spread in the longitudinal direction of the cable, so that its ability to function is maintained even in cable-jointing sleeves.

BRIEF DESCRIPTION OF THE DRAWINGS

Specific embodiments of the object of the invention are illustrated in the drawings.

DETAILED DESCRIPTION

Figure 1:
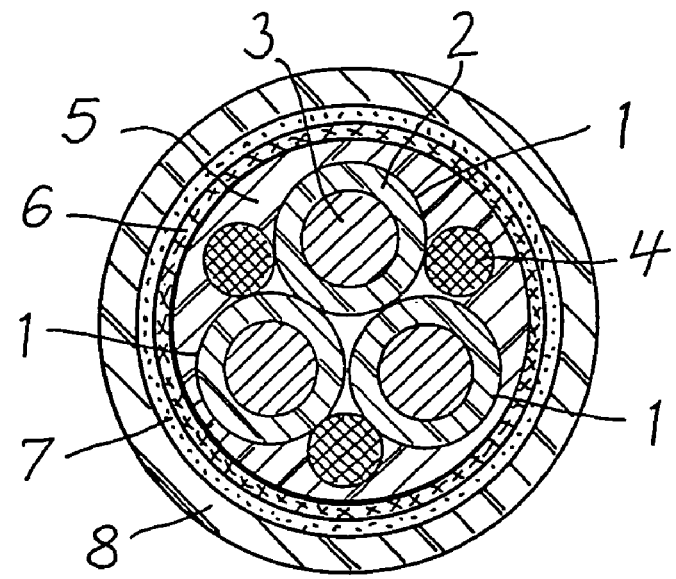
FIG. 1 shows a cross section through a cable in accordance with the invention.

The cable shown in the drawings has three conductor cores 1 that are stranded together, each of which consists of an electrical conductor 3 surrounded by insulation 2. The number of conductor cores and their embodiments are variable. For example, they can serve as power conductors and conductors for signal and/or data transmission. The individual conductor cores 1 can also be shielded to increase noise immunity. The insulation 2 can be made, for example, of a polyolefin, a thermoplastic elastomer (TPE), or crosslinkable polymers, which can be crosslinked by irradiation or by the CV method. As a rule, at least all of the types of conductor cores that have been mentioned are contained in a cable which is used, for example, as a connecting cable for welding robots.

Filler elements 4 can be arranged in the stranding gaps between the conductor cores 1, so that the overall result is an approximately circular structure. The conductor cores 1 and filler elements 4 are surrounded by a sheath 5 of insulating material, whose wall thickness is at least 0.5 mm. The sheath 5 is applied by means of an extruder. Preferably, it consists of a halogen-free thermoplastic material. A crosslinkable polymer, which can be crosslinked by irradiation or by the CV method, can also be used for the sheath 5. The cable consisting of the conductor cores 1 and sheath 5 can be used for its intended purpose basically without further elements.

In the cable of the invention, a strip 6 made of a flameproof material is applied over the sheath 5. It is wound around the sheath 5 in at least one course with overlapping edges. It is advantageous for the strip 6 to consist of a glass-fiber or ceramic-fiber fabric strip or of a glass/silicone/mica strip, which is commercially available as "Mica-Band." It forms a closed covering around the sheath 5. This covering is resistant to red-hot particles, for example, drops of welding material. The strip 6 is thus an effective barrier for the enclosed cable and prevents red-hot particles from penetrating the cable.

The covering formed by the strip 6 is surrounded by a layer 7 of a material that swells when exposed to moisture. For example, a strip-like material made of a nonwoven polyester with a swelling barrier coating can be wound around the strip 6 for this purpose. A strip of polyacrylate with a swelling barrier coating that consists of a polyvinyl alcohol, a synthetic superabsorber, and a corrosion inhibitor can also be used for the layer 7. The layer 7 blocks the passage of moisture through possibly damaged parts of the layers of the cable that surround the layer 7. The layer 7 then prevents moisture from spreading in the longitudinal direction of the cable. In particular, this prevents moisture from reaching cable-jointing sleeves.

For safety reasons, an inner layer of a material that swells when exposed to moisture can be placed over the sheath 5 before the strip 6 is applied. A layer of this type can be important if damage to the layers surrounding the strip 6 occurs right at an overlap point of the strip 6. Moisture possibly penetrating the overlap point is then blocked by the inner layer.

An outer sheath 8 is applied over the layer 7 by an extruder. It generally consists of a flame-resistant, halogen-free insulating material, for example, polyurethane. However, it is also possible to use a different crosslinkable or noncrosslinkable polymer compound for the outer sheath 8.

In addition, the layer 7 can be surrounded by an anti-twist braided yarn, which is embedded in the material of the outer sheath 8 as the outer sheath 8 is extruded.

Figure 2:
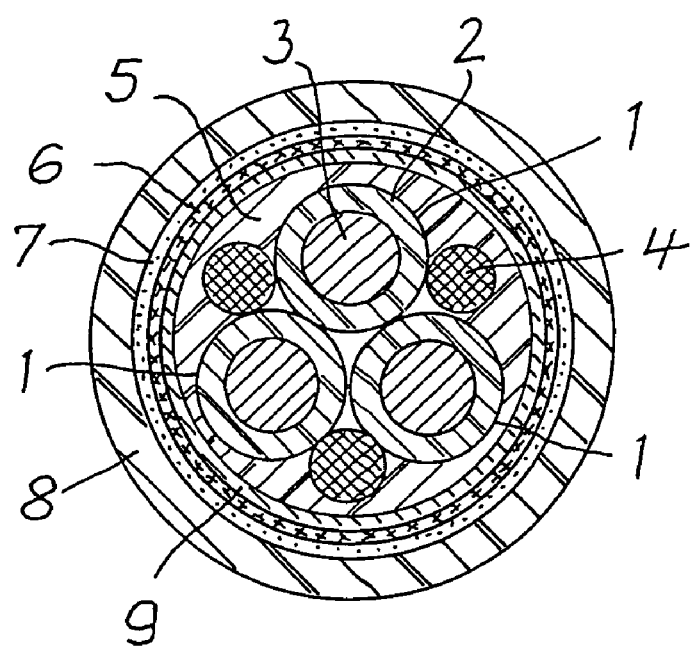
FIG. 2 shows a cross section through a cable that has been supplemented relative to FIG. 1.

As shown in FIG. 2, the cable of the invention can have a shield 9 to provide it with electrically effective shielding. The shield 9 can be realized as a braided fabric or as stranded copper wires. As shown in FIG. 2, the shield 9 is applied over the sheath 5. Similarly to FIG. 1, the shield 9 is surrounded by the strip 6 of flameproof material, the swellable layer 7, and the outer sheath 8.

The invention claimed is:

1. Electrical cable comprising:
   two portions, a first portion has at least two electrical conductor cores, which are stranded together, and each of which includes an electrical conductor surrounded by an insulation, and with a first sheath of insulating material that encloses the conductor cores,
   wherein in order to protect the cable, said first portion which in itself is complete and fully functional, said first sheath, has a wall thickness of at least 0.5 mm,
   said firs portion being covered with a second portion which serves as a protecting sheath of said first portion,
   said second portion having at least two specific coatings, a first coating being a barrier in the form of a ribbon, which is wound around said first portion in at least one course with overlapping edges and which is made from a material which is both flame proof and resistant against red-hot particles configured to prevent such red-hot particles from damaging said first sheath of said first portion; and
   said first coating barrier in the form of a ribbon being covered with a second coating of a material that swells when exposed to moisture, said first and second coatings of said second portion being contained within a second outer sheath of insulating material, such that water that enters through said second outer sheath is captured and prevented from spreading longitudinally along said cable by said second coating of material that swells when exposed to moisture.

2. Cable in accordance with claim 1, wherein said first sheath of said first portion includes a halogen-free thermoplastic insulating material.

3. Cable in accordance with claim 1, wherein said first sheath of said first portion includes a thermoplastic elastomer.

4. Cable in accordance with claim 1, wherein said first sheath of said first portion includes a crosslinkable insulating material.

5. Cable in accordance with claim 1, wherein said first coating of said second portion in the form of a barrier strip is realized as a glass/silicon/mica strip.

6. Cable in accordance with claim 1, wherein said first coating of said second portion in the form of a barrier strip is realized as a glass-fiber or ceramic-fiber fabric strip.

7. Cable in accordance with claim 1, wherein said second coating in said second portion in the form of a layer of the material that swells when exposed to moisture is realized as a strip-like material made of a nonwoven polyester with a swelling barrier coating.

8. Cable in accordance with claim 1, wherein said second coating in said second portion in the form of a layer of the material that swells when exposed to moisture is realized as a strip-like material made of a polyacrylate with a swelling barrier coating.

9. Cable in accordance with claim 1, wherein said second portion includes a third coating in the form of a shield that is realized as a braided fabric or as stranded copper wires is applied over said first sheath of said first portion and under said first coating of said second portion.

10. Cable in accordance with claim 1, wherein said second outer sheath of said second portion includes a flame-resistant, halogen-free insulating material.

* * * * *